US008186154B2

(12) United States Patent
Nelson et al.

(10) Patent No.: US 8,186,154 B2
(45) Date of Patent: May 29, 2012

(54) ROTARY FLOW CONTROL VALVE WITH ENERGY RECOVERY

(75) Inventors: Bryan Nelson, Lacon, IL (US); Kirat Shah, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 807 days.

(21) Appl. No.: 12/289,695

(22) Filed: Oct. 31, 2008

(65) Prior Publication Data

US 2010/0107620 A1 May 6, 2010

(51) Int. Cl.
*F16D 31/02* (2006.01)

(52) U.S. Cl. ............................... 60/414; 60/419; 60/459

(58) Field of Classification Search .................... 60/413, 60/414, 419, 431, 459
See application file for complete search history.

(56) References Cited

U.S. PATENT DOCUMENTS 4,761,953 A 8/1988 Rosman
4,819,429 A 4/1989 Kordak
4,920,748 A 5/1990 Kordak et al.
4,928,487 A 5/1990 Nikolaus
4,974,994 A 12/1990 Kirstein et al.
5,179,836 A 1/1993 Dantlgraber
6,460,332 B1 10/2002 Maruta et al.
6,575,076 B1 6/2003 Achten
6,647,719 B2 11/2003 Truninger
6,854,268 B2 2/2005 Fales et al.
6,973,780 B2 12/2005 Hahn et al.
7,028,470 B1 4/2006 Achten
7,124,576 B2 10/2006 Cherney et al.
7,234,298 B2 6/2007 Brinkman et al.
7,290,389 B2 11/2007 Singh

*Primary Examiner* — Michael Leslie

(74) *Attorney, Agent, or Firm* — Finnegan, Henderson, Farabow, Garrett & Dunner LLP

(57) ABSTRACT

A hydraulic circuit is provided having a hydraulic actuator and a flow control valve. The flow control valve has a pressure adjusting element fluidly coupled to the hydraulic actuator and situated to affect a pressure of fluid being directed to the hydraulic actuator. The flow control valve also has an energy directing element operatively coupled to the pressure adjusting element and situated to be driven by the pressure adjusting element when the pressure adjusting element is selectively throttling fluid being directed to the hydraulic actuator.

20 Claims, 7 Drawing Sheets

ROTARY FLOW CONTROL VALVE WITH ENERGY RECOVERY

TECHNICAL FIELD

The present disclosure is directed to a rotary flow control valve and, more particularly, to a rotary control valve with energy recovery.

BACKGROUND

Machines such as, for example, wheel loaders, dozers, backhoes, dump trucks, and other heavy equipment often utilize a hydraulic system having one or more hydraulic cylinders to assist the performance of various tasks. Such hydraulic systems typically use load sensing pumps and controls to affect the flow of fluid being directed to the hydraulic cylinders. The fluid pressure generated by a load sensing pump is often dictated by the hydraulic cylinder having the largest load. However, the other hydraulic cylinders may not require such a magnitude of fluid pressure. Therefore, the pressure of fluid being directed to the other hydraulic cylinders may need to be reduced.

One method used to reduce the fluid pressure is the employment of flow control valves, which throttle the flow of the fluid. Throttling the fluid removes energy from the flow and ultimately reduces the fluid pressure. However, once the energy from the flow is removed, it is not recovered and becomes wasted energy. The efficiency of the system can be improved if the energy removed during throttling is recovered for later use.

Another issue facing hydraulic systems utilizing multiple hydraulic cylinders involves providing a temporary pressure boost to the hydraulic cylinders. Some applications may require a temporary boost of force generated by a particular cylinder. However, relying on the load sensing pump to provide such a pressure boost may be inefficient. In particular, because the load sensing pump serves all hydraulic cylinders of the hydraulic system, any pressure increase generated by the load sensing pump will increase the pressure of fluid being supplied to cylinders not needing a pressure boost. In addition, at least a portion of the energy used to boost the fluid pressure is lost when the fluid being supplied to hydraulic cylinders not needing the pressure boost is throttled by flow control valves. Furthermore, sizing the load sensing pump to generate the necessary pressure in the system for such a boost may be inefficient because such a pressure would be needed only for a small percentage of the pump's duty cycle.

One method for recovering energy from a hydraulic circuit can be found in U.S. Pat. No. 6,460,332 (the '332 patent) issued to Maruta et al. on Oct. 8, 2002. The '332 patent discloses a pressure energy recovery apparatus within a hydraulic circuit. The pressure energy recovery apparatus includes a hydraulic motor/pump operationally connected to a motor/generator. The motor/generator is operationally connected to a battery. In a first mode, the motor/pump is actuated by an inflow of fluid flowing out of a hydraulic actuator. The motor/pump drives the motor/generator to produce energy, which is stored within the battery. In a second mode, stored energy within the battery actuates the motor/generator, which drives the motor/pump. The motor/pump produces a outflow of pressurized fluid to supplement the flow of pressurized fluid supplied by the hydraulic circuit's main pump.

Although the pressure energy recovery apparatus of the '332 patent may recover energy from fluid exiting from the hydraulic actuator, the energy recovery capacity of the hydraulic circuit may be limited. In particular, the pressure energy recovery apparatus does not control the pressure of fluid entering the hydraulic cylinder. Instead, conventional flow control valves are used, which do not recover the energy removed from the fluid during throttling. Therefore, the energy recovery capacity and ultimately the efficiency of the system is limited. Furthermore, using a separate flow control valve may increase costs and complexity of the system.

In addition, the system of the '332 patent directs the recovered energy to the main drive pump. As discussed above, at least a portion of the recovered energy is wasted when a particular cylinder requires a boost in pressure. This is because the recovered energy is also used to boost the pressure of fluid flowing to other hydraulic cylinders. The recovered energy is lost when flow control valves associated with the other hydraulic cylinders throttle the fluid flows, thereby removing the recovered energy contained within such flows.

The disclosed system is directed to overcoming one or more of the shortcomings set forth above and/or other shortcomings in the art.

SUMMARY

In one aspect, the present disclosure is directed toward a hydraulic circuit including a hydraulic actuator and a flow control valve. The flow control valve includes a pressure adjusting element fluidly coupled to the hydraulic actuator and situated to affect a pressure of fluid being directed to the hydraulic actuator. The flow control valve also includes an energy directing element operationally coupled to the pressure adjusting element and situated to be driven by the pressure adjusting element when the pressure adjusting element is selectively throttling fluid being directed to the hydraulic actuator. The flow control valve further includes an energy storage device operationally coupled to the energy element and situated to store the energy received by the energy element when the energy element is being driven by the pressure adjusting element.

In another aspect, the present disclosure is directed toward a hydraulic circuit including one or more hydraulic actuators fluidly connected to one or more flow control valves. Each of the one or more flow control valves includes a plurality of pressure adjusting elements fluidly connected to an associated hydraulic actuator and situated to affect a pressure of fluid being directed to the associated hydraulic actuator. Each of the one or more flow control valves also includes an energy element operatively coupled to the plurality of pressure adjusting elements and situated to be driven by the plurality of pressure adjusting elements when the plurality of pressure adjusting elements generate a surplus of energy.

In yet another aspect of the disclosure, a method is provided for regulating the flow of fluid to and from a hydraulic actuator. The method includes directing a fluid to the hydraulic actuator and determining a first pressure value. The method also includes determining if a second pressure value, indicative of a pressure of the fluid, is greater than the first pressure value. The method also includes selectively throttling the fluid by extracting energy from the fluid if the second pressure value is greater than the first pressure value. The method further includes selectively boosting the fluid by providing energy to the fluid if the second pressure value is less than the first pressure value.

DETAILED DESCRIPTION

Figure 1:
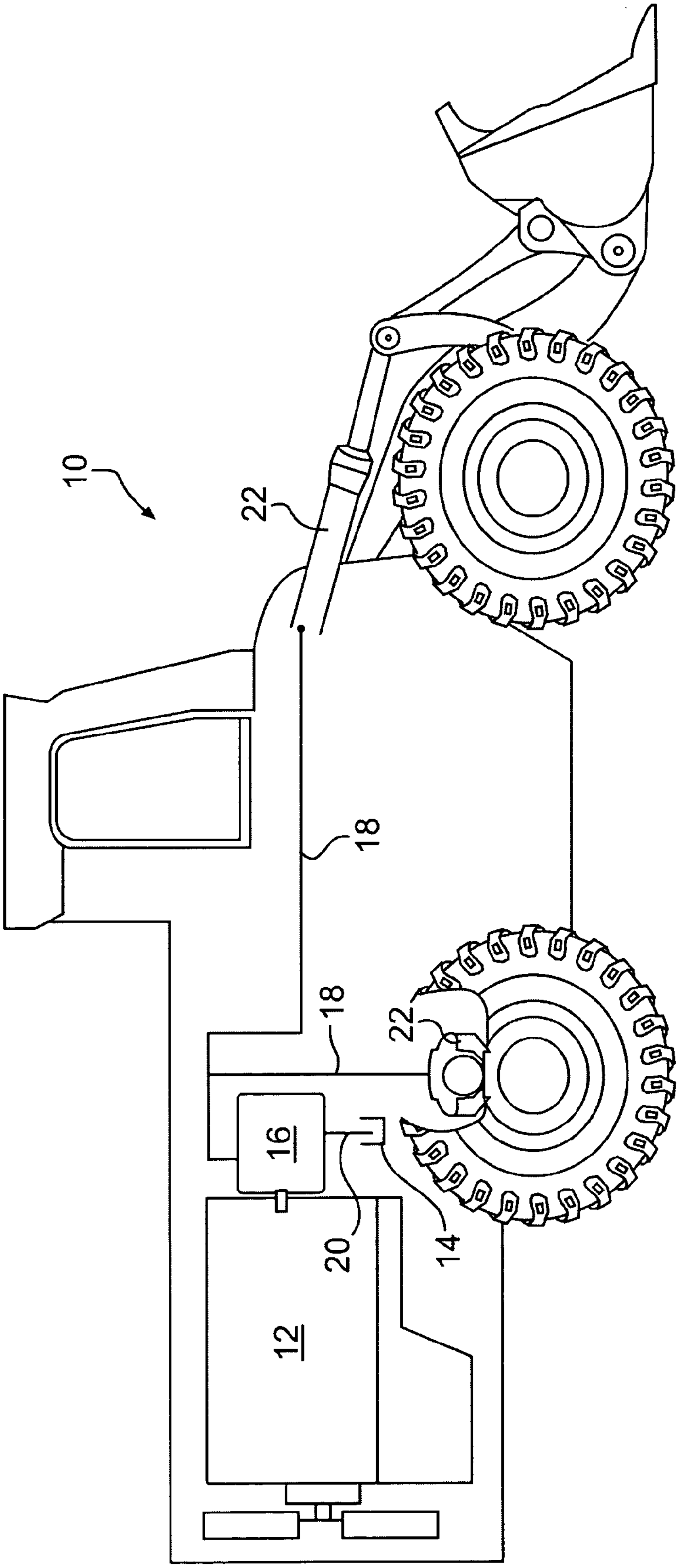
FIG. 1 is a diagrammatic illustration of an exemplary disclosed machine.

FIG. 1 illustrates an exemplary machine 10. Machine 10 may be stationary or mobile and may perform some type of operation associated with an industry such as mining, construction, farming, transportation, power generation, or any other industry known in the art. For example, machine 10 may embody a wheel loader configured to move earth at a construction site, a passenger vehicle configured to transport people or goods, or any other type of machine known in the art. Machine 10 may include, among other things, a power source 12, a tank 14, a main drive pump 16, and one or more hydraulic circuits 18.

Power source 12 may embody an engine such as, for example, a diesel engine, a gasoline engine, a gaseous fuel-powered engine such as a natural gas engine, or any other type of combustion engine apparent to one skilled in the art. Power source 12 may alternatively embody a non-combustion source of power such as a fuel cell, a power storage device, or any other suitable source of power. Power source 12 may produce a mechanical or electrical power output that drives main drive pump 16 to pressurize fluid.

Tank 14 may constitute a reservoir configured to hold a supply of low pressure fluid. The fluid may include, for example, a dedicated hydraulic oil, an engine lubrication oil, a transmission lubrication oil, an engine fuel, or any other fluid known in the art. One or more hydraulic systems within machine 10 may draw fluid from and return fluid to tank 14. It is also contemplated that machine 10 may alternatively be connected to multiple separate fluid tanks.

Main drive pump 16 may draw fluid from tank 14 via a suction line 20 and may produce a flow of fluid for pressurizing hydraulic circuits 18. Main drive pump 16 may embody a variable displacement pump such as a swash plate-piston type pump or another type of pump configured to produce a variable flow of pressurized fluid. Furthermore, main drive pump 16 may be drivably connected to power source 12 by, for example, a countershaft (not shown), a belt (not shown), an electrical circuit (not shown), or in any other suitable manner such that an output rotation of power source 12 provides the energy input for a pumping action of main drive pump 16.

Figure 2:
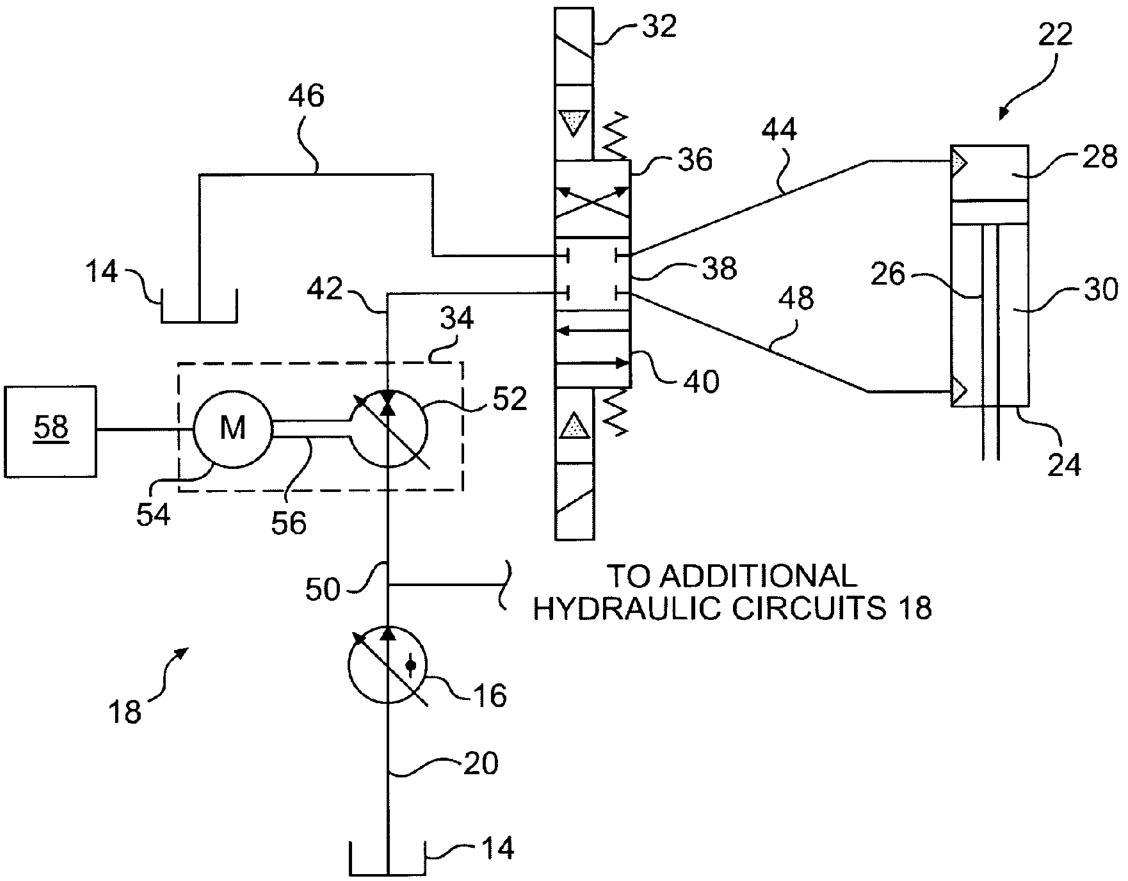
FIG. 2 is a schematic illustration of an exemplary hydraulic circuit for use with the machine of FIG. 1.

Hydraulic circuits 18 may receive pressurized fluid from main drive pump 16 and direct the pressurized fluid to one or more hydraulic actuators 22. Such hydraulic actuators may include, for example, a brake mechanism, a fluid cylinder, a steering mechanism, a cooling component, a pilot operated control device, a drive motor, a swing motor, and other devices known in the art. As illustrated in FIG. 2, an exemplary hydraulic actuator 22 may include a tube 24 and a piston assembly 26 disposed within tube 24 to form a first chamber 28 and a second chamber 30. Chambers 28 and 30 may be selectively supplied with pressurized fluid and drained of the pressurized fluid to cause piston assembly 26 to displace within tube 24. The flow rate of fluid into and out of chambers 28 and 30 may relate to a velocity of hydraulic actuator 22, while a pressure differential between first and second chambers 28 and 30 may relate to a force exerted by hydraulic actuator 22. To affect the movement of hydraulic actuators 22, each hydraulic circuit may include an actuator control valve 32 and a rotary flow control valve 34.

Actuator control valve 32 may be a solenoid-operated valve having a first position 36, a second position 38, and a third position 40, each of which, may affect the direction of fluid into and out of chambers 28 and 30, thereby affecting a velocity of piston assembly 26. In first position 36, a supply passageway 42 fluidly connected to rotary flow control valve 34 may be connected to a head end passageway 44, which may be fluidly connected to first chamber 28. In addition, a return passageway 46 fluidly connected to tank 14 may be connected to a rod end passageway 48, which may be fluidly connected to second chamber 30. In second position 38, actuator control valve 32 may isolate hydraulic actuator 22 from rotary flow control valve 34 and tank 14. In third position 40, actuator control valve 32 may connect supply passageway 42 to rod end passageway 48, and may connect return passageway 46 to head end passageway 44. Actuator control valve 32 may be set to first, second, or third positions 36, 38, 40 hydraulically, mechanically, pneumatically, or in any other suitable manner.

Rotary flow control valve 34 may receive pressurized fluid from main drive pump 16 via a fluid passageway 50 and may affect the pressure of fluid being directed to first and second chambers 28 and 30, thereby affecting a force exerted by the associated hydraulic actuator 22. Rotary flow control valve 34 may operate in either a pressure reducing mode or a pressure boosting mode and may include a pressure adjusting (PA) element 52 operationally coupled to an energy directing (ED) element 54 via a shaft 56. While operating in the pressure reducing mode, rotary flow control valve 34 may throttle the pressure of fluid being supplied to chambers 28 and 30 by extracting pressure energy from the fluid. Once extracted, the energy may be stored for later use or, as described in more detail below, directed to one or more other components of machine 10, such as, for example, power source 12. Conversely, while operating in the pressure boosting mode, rotary flow control valve 34 may use the stored energy to increase the pressure of fluid being directed to chambers 28 and 30.

PA element 52 may affect the pressure change of the fluid flowing through rotary flow control valve 34 by adjusting a volume change of the fluid as it flows through PA element 52. PA element 52 may embody a variable displacement hydraulic pump/motor such as for example, a bent axis, an inline piston, a floating cup, or any other type of hydraulic pump/motor having variable displacement. In addition, ED element 54 may govern the mode in which rotary flow control valve 34 may operate, e.g., pressure reducing or pressure boosting. For example, in a pressure reducing mode, ED element may receive energy from PA element 52 and direct energy toward an energy storage device 58. Alternatively, in a pressure boosting mode, ED element may receive energy from energy storage device 58 and direct energy toward PA element 52. ED element 54 may embody any known motor/generator such as, for example, a permanent magnet, induction, switched-reluctance, or hybrid combination of the above, and may also be sealed, brushless, and/or liquid cooled.

Energy storage device 58 may be a battery assembly and may include one or more devices configured to store electricity. For example, energy storage device 58 may include first and second batteries connected in parallel. It is contemplated that energy storage device 58 may additionally or alternately be a capacitor or any other device know in the art that is capable of storing electricity. In addition, machine 10 may include multiple energy storage devices 58, wherein each rotary flow control valve 34 may be associated with an energy storage device 58. Alternatively, machine 10 may include a single energy storage device 58, which may be associated with each of the rotary flow control valves 34 of machine 10. It is also contemplated that energy extracted via rotary control valve 34 may be directed toward power source 12. For example, PA element 52 may be mechanically coupled to a crankshaft of power source 12 via any suitable mechanical connection, such as, for example, a gear train. As such, energy storage device 58 may be selectively omitted.

It is contemplated that in an alternate embodiment, ED element 54 may embody a variable fluid pump/motor, e.g., a hydraulic pump/motor similar to PA element 52 or a pneumatic pump/motor. In such an embodiment, ED element 54 may direct and draw hydraulic or pneumatic fluid to and from energy storage device 58. In addition, energy storage device 58 may embody an accumulator if the fluid associated with ED element 54 is hydraulic or a receiver, i.e., a pneumatic equivalent of an accumulator, or other pressure vessel if the fluid associated with ED element 54 is pneumatic.

When it is desired to reduce the pressure of fluid being supplied to hydraulic actuator 22, ED element 54 may be set to operate in an energy receiving mode. In such a mode, ED element 54 may receive energy from PA element 52 via shaft 56. With ED element 54 set to receive energy from PA element 52, the pressure energy contained within the fluid flowing through PA element 52 may be the only substantial source of energy acting of PA element 52. Therefore, the pressure energy may cause PA element 52 to rotate shaft 56, thereby converting a portion of the pressure energy to mechanical energy. The resulting reduction of pressure energy may cause the fluid pressure to drop.

The pressure change may be affected by adjusting the displacement setting of PA element 52. For example, larger changes in the volume of fluid flowing through PA element 52 may result in larger percentages of pressure energy being converted to mechanical energy and ultimately larger pressure reductions. Conversely, smaller changes in the volume of fluid flowing through PA element 52 may result in smaller percentages of pressure energy being converted to mechanical energy and ultimately smaller pressure reductions.

While operating in the pressure receiving mode, ED element 54 may transform the mechanical energy into a storable form that may be stored in energy storage device 58. For embodiments in which ED element 54 is a motor/generator, the mechanical energy may be converted to electrical energy. For embodiments in which ED element 54 is a pump/motor, the mechanical energy may be converted back to pressure energy. It is contemplated that the energy stored in energy storage device 58 may be used to power various accessory devices (not shown), as desired. Such accessory devices may include, for example, one or more of an air conditioning unit, a heating unit, lights, appliances, personal electronics, pumps, motors, and other engine components and accessories known in the art.

When it is desired to boost the pressure of fluid being supplied to hydraulic actuator 22, ED element 54 may be set to operate in an energy directing mode. In such a mode, ED element 54 may direct energy from energy storage device 58 to PA element 52. Before directing the energy to PA element 52, ED element 54 may convert the stored energy to mechanical energy, which may drive PA element 52. The mechanical energy driving PA element 52 may cause PA element 52 to act as a pump, thereby increasing the pressure of the fluid flowing through rotary flow control valve 34.

Just as in the pressure reducing mode, the pressure change may be affected in the pressure boosting mode by adjusting the displacement setting of PA element 52. For example, larger changes in volume of fluid flowing through PA element 52 may result in larger pressure increases. Conversely, smaller changes in volume may result in smaller pressure increases. In addition, the amount of energy needed to achieve the desired fluid pressure may be related to the pressure change. Therefore, larger pressure boosts may consume more energy than smaller pressure boosts. If the energy stored in energy storage device 58 is not enough to achieve the desired pressure, main pump drive 16 may increase the overall pressure of fluid circulating within the hydraulic circuits 18 of machine 10. Such an increase in overall pressure may reduce the pressure change needed to achieve the desired pressure, thereby reducing the amount of energy consumed by PA element 52.

Figure 3:
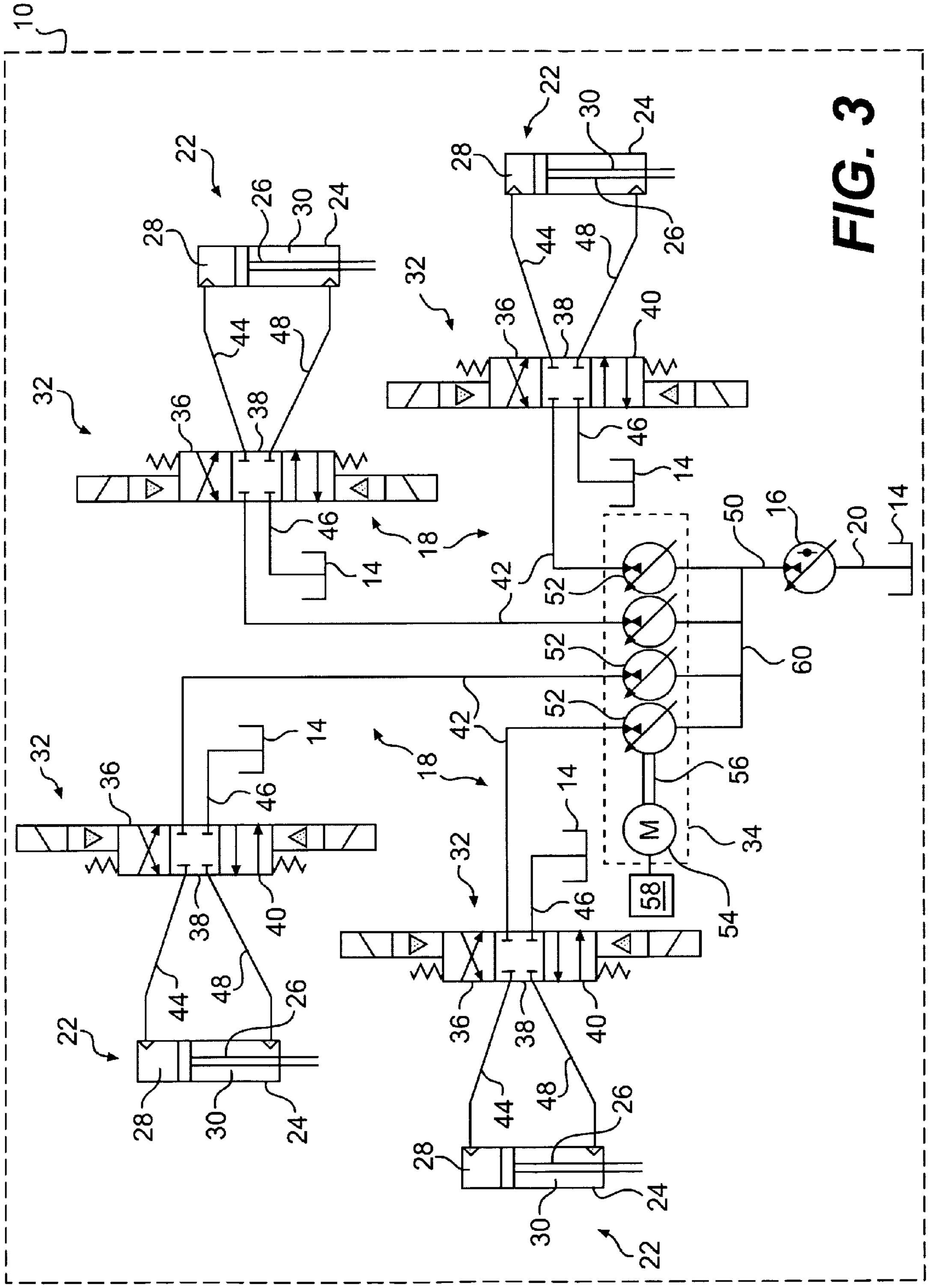
FIG. 3 is a schematic illustration of multiple exemplary hydraulic circuits for use with the machine of FIG. 1.

FIG. 3 illustrates another exemplary embodiment of machine 10 in which, rotary flow control valve 34 may include a plurality of PA elements 52 operationally connected to ED element 52 via shaft 56. As can be seen, each hydraulic circuit 18 may be associated with a dedicated PA element 52 rather than all PA elements 52 of rotary flow control valve 34. Pressurized fluid from main drive pump 16 may be received by rotary flow control valve 34 via an intake manifold 60. In addition, each PA element 52 may be fluidly coupled to an associated actuator control valve 32 via supply passageways 42. It is contemplated that although rotary flow control valve 34 is illustrated having four PA elements 52, rotary flow control valve 34 may include fewer or greater PA elements 52, as desired.

Because rotary flow control valve 34 may include multiple PA elements 52, rotary flow control valve 34 may operate in the pressure reducing mode, in the pressure boosting mode, or in both modes simultaneously. In addition, the mode in which rotary flow control valve 34 may be operating may be governed by PA elements 52 and ED element 54. For example, rotary flow control valve 34 may operate in only the pressure reducing mode when all PA elements 52 are reducing the pressure of fluid being directed to hydraulic actuators 22. In addition, rotary flow control valve 34 may operate in only the pressure boosting mode when all PA elements 52 are boosting the pressure of fluid being directed to hydraulic actuators 22. Furthermore, rotary flow control valve 34 may operate in both modes when some PA elements 52 are reducing the pressure of fluid being directed to hydraulic actuators 22 and the rest of PA elements 52 are boosting the pressure of fluid being directed to hydraulic actuators 22.

Similar to the previously disclosed embodiment, if the current pressure of fluid being supplied to each hydraulic actuator 22 is greater than desired, ED element 54 may operate in the energy receiving mode. In circumstances where the change in pressure of fluid flowing through each PA element 52 is substantially the same, pressure energy in the fluid flowing through each PA element 52 may generate substantially the same amount of mechanical energy, which may be directed to and stored in energy storage device 58 via ED element 54. However, if the pressure change associated with any PA element 52 is different from pressure changes associated with other PA elements 52, the amount of mechanical energy generated by each PA element 52 may vary from PA element 52 to PA element 52. In such a circumstance, mechanical energy generated by PA elements 52 associated with larger pressure changes may at least partially drive PA elements 52 associated with smaller pressure changes, thereby counteracting the pressure energy of fluid flowing through such PA elements 52. In other words, PA elements 52 associated with smaller pressure changes may be affected by both mechanical energy from shaft 56 and pressure energy contained within the fluid. Therefore, the change in volume of fluid flowing through such a PA element 52 may need to be larger to achieve a desired pressure than would otherwise be necessary without mechanical energy acting against the pressure energy.

If the current pressure of fluid being supplied to each hydraulic actuator 22 is less than desired, ED element 54 may operate in the energy directing mode. In circumstances where the change in pressure of fluid flowing through each PA element 52 is substantially the same, the amount of energy consumed by each PA element 52 may also be substantially the same. However, if the pressure change associated with any PA element 52 is different from pressure changes associated with other PA elements 52, the amount of energy consumed by each PA element 52 may vary from PA element 52 to PA element 52. The amount of energy directed to PA elements 52 may be governed by the needs of the PA element 52 having the highest energy demand (i.e., the PA element 52 associated with the greatest pressure change). However, such an energy level may cause PA elements 52 associated with smaller pressure changes to pressurize the fluid to levels that may exceed the desired pressures. In other words, PA elements 52 associated with smaller pressure changes may be driven faster than desired by shaft 56. To compensate, the volume change of fluid flowing through such PA elements 52 may need to be smaller than would otherwise be necessary. In addition, if there is not enough energy stored in energy storage device 58 to meet the energy demands of the pressure boosting PA elements 52, main drive pump 16 may increase the overall pressure of the hydraulic circuits 18 of machine 10.

If the current pressures of fluid being supplied to hydraulic actuators 22 are less than desired for some hydraulic actuators 22 and greater than desired for other hydraulic actuators 22, ED element 54 may initially operate in the energy receiving mode. The displacement settings of each PA element 52 may be adjusted to either reduce or boost pressure flowing through each PA element 52. Mechanical energy generated by those PA elements 52 reducing pressure may be consumed by those PA elements 52 boosting pressure. If there is a surplus of energy generated by the pressure reducing PA elements 52 that is not consumed by the pressure boosting PA elements 52, the surplus may be directed to ED element 54, where it may be transformed into a storable form and stored in energy storage device 58. However, if the pressure reducing PA elements 52 do not generate enough energy to drive the pressure boosting PA elements 52, ED element 54 may operate in the energy directing mode, thereby increasing the amount of energy available to drive the pressure boosting PA elements 52. If there is not enough energy stored in energy storage device 58 to meet the energy demands of the pressure boosting PA elements 52, main drive pump 16 may increase the overall pressure of the hydraulic circuits 18 of machine 10.

Figure 4:
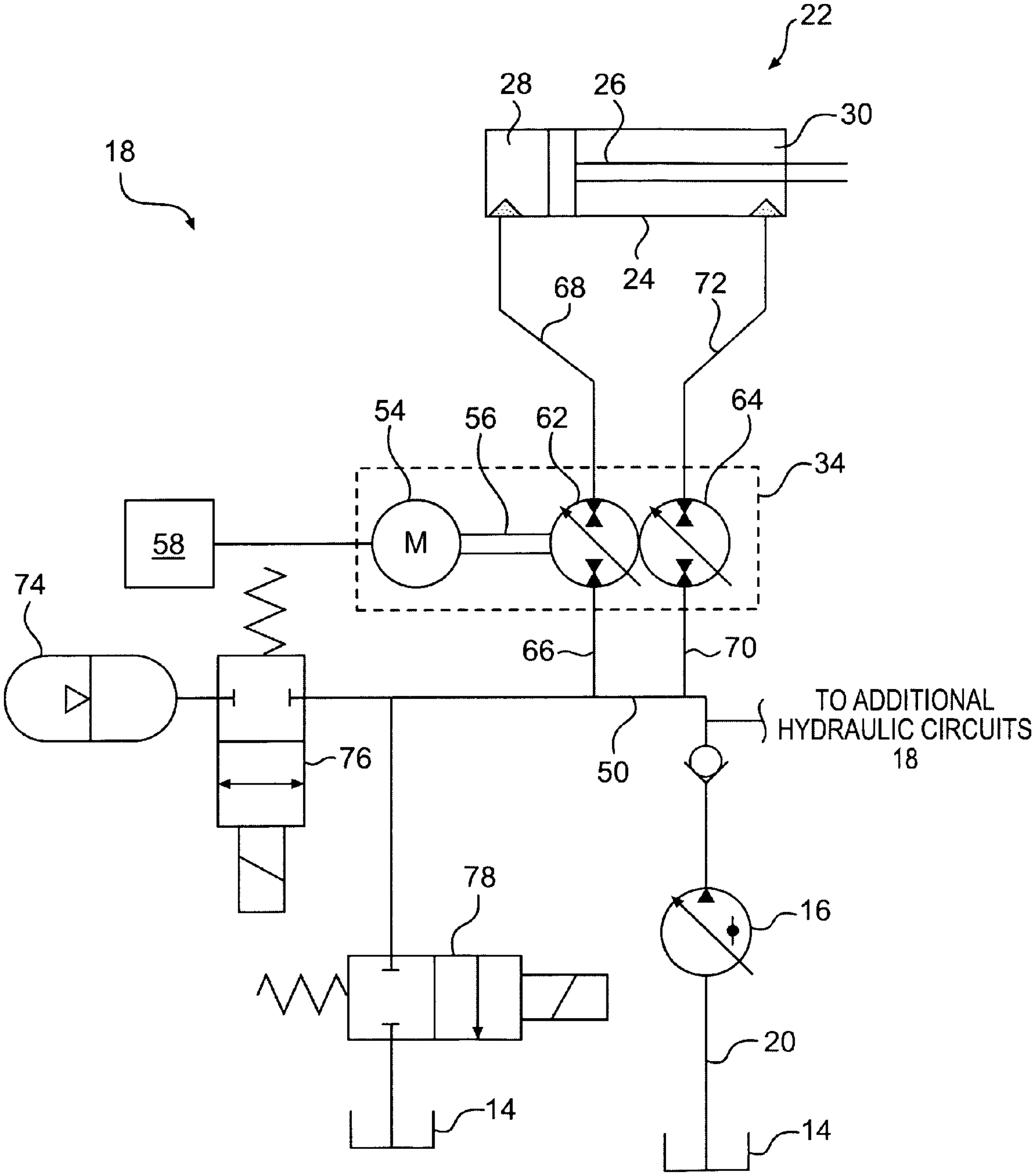
FIG. 4 is a schematic illustration of yet another exemplary hydraulic circuit for use with the machine of FIG. 1.

FIG. 4 illustrates yet another exemplary embodiment of hydraulic circuits 18 in which, rotary flow control valve 34 may affect the flow rate of fluid flowing into and out of chambers 28 and 30 of hydraulic actuators 22 in addition to regulating the pressure of the fluid. Because rotary flow control valve 34 may assume the functions performed by actuator control valve 32, actuator control valve 32 may be omitted from the exemplary embodiment.

In the exemplary embodiment illustrated in FIG. 4, rotary flow control valve 34 may include a first over-center pressure adjusting (OPA) element 62 and a second over-center pressure adjusting (OPA) element 64 operationally coupled to ED element 54 via shaft 56. Similar to PA elements 52, each of OPA elements 62 and 64 may embody a variable displacement hydraulic pump/motor such as for example, a bent axis, an inline piston, a floating cup, or any other type of hydraulic motor having variable displacement. However, unlike the PA elements 52, the flow of fluid entering and exiting each of OPA elements 62 and 64 may be reversible. Such reversibility may permit rotary flow control valve 34 to supply and drain fluid to and from chambers 28 and 30.

First OPA element 62 may be fluidly connected to fluid passageway 50 via a fluid passageway 66 and may be fluidly connected to chamber 28 via a fluid passageway 68. In addition, second OPA element 64 may be fluidly connected to fluid passageway 50 via a fluid passageway 70 and may be fluidly connected to chamber 30 via a fluid passageway 72. When increasing the volume of chamber 28, the displacement setting of first OPA element 62 may be adjusted to draw fluid from fluid passageway 50 and direct the fluid to chamber 28. In addition, the displacement setting of second OPA element 64 may be adjusted to drain fluid from chamber 30 and direct the fluid to fluid passageway 50. When increasing the volume of chamber 30, the displacement setting of first OPA element 62 may be adjusted to drain fluid from chamber 28 and direct the fluid to fluid passageway 50. In addition, the displacement setting of second OPA element 64 may be adjusted to draw fluid from fluid passageway 50 and direct the fluid to chamber 30.

When drawing fluid from fluid passageway 50, first and second OPA elements 62, 64 may adjust displacement settings to either throttle or boost the pressure of fluid being supplied to hydraulic actuator 22. In addition, when draining fluid from passageway 50, first and second OPA elements 62, 64 may adjust displacement settings to either throttle or boost the pressure of fluid being returned to fluid passageway 50. Pressure energy may be extracted from either of the two fluid flows in rotary flow control valve 34 in a manner similar to that disclosed above for the previously disclosed embodiments. In addition, Pressure energy may be injected into either of the two fluid flows in rotary flow control valve 34 in a manner similar to that disclosed above for the previously disclosed embodiments.

In some circumstances, hydraulic circuit 18 may not have enough fluid to achieve the desired flow rate and/or desired pressure. In other circumstances, hydraulic circuit 18 may have a surplus of fluid, which may not be desired. To address these circumstances, hydraulic circuit 18 may include an accumulator 74 and an associated on/off valve 76 fluidly connected to fluid passageway 50. On/off valve 76 may be biased to an "off" position preventing fluid from flowing into or out of accumulator 74. In addition, hydraulic circuit 18 may include an on/off valve 78 fluidly connected to fluid passageway 50 and tank 14. On/off valve 78 may also be biased to an "off" position preventing fluid from flowing to tank 14.

When hydraulic circuit 18 has an undesired surplus of fluid, on/off valve 76 may be set to an "on" position, which may permit the flow of fluid into accumulator 74. If accumulator 74 is full and hydraulic circuit 18 still has more fluid than desired, an on/off valve 78 associated with tank 14 may be set to an "on" position, which may permit fluid to flow into tank 14. When hydraulic circuit 18 has a deficit of fluid, on/off valve 76 may be set to an "on" position, which may permit the flow of fluid out of accumulator 74. If the accumulator 74 has no fluid or not enough fluid to meet the demand, main drive pump 16 may be adjusted to increase the supply of fluid to hydraulic circuit 18. It is contemplated that accumulator 74 and on/off valve 76 may be omitted and that main drive pump 16 may be used to compensate for any pressure deficit.

Figure 5:
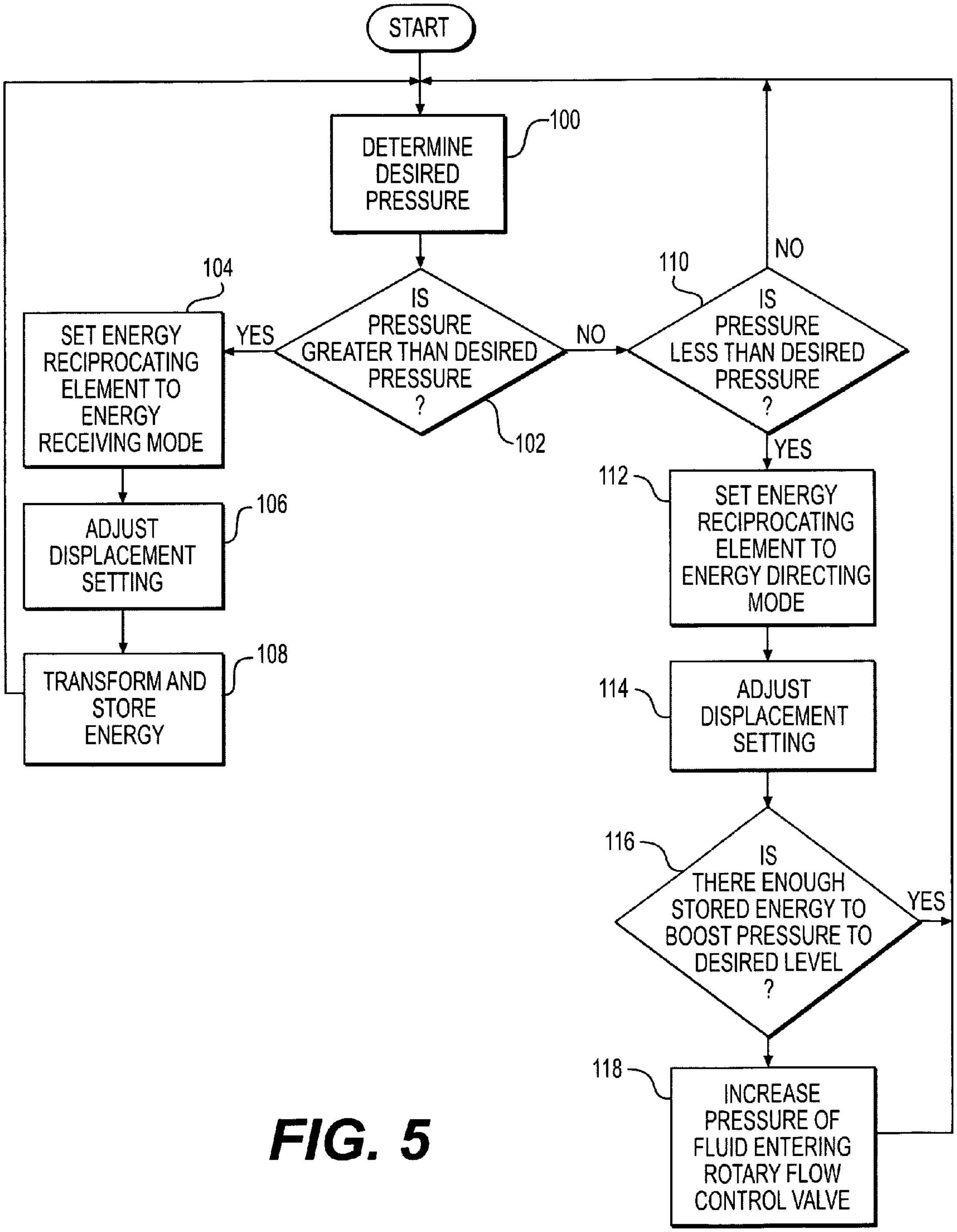
FIG. 5 is a flow chart illustrating an exemplary method for operating a rotary flow control valve of the exemplary hydraulic circuit of FIG. 2.
Figure 6:
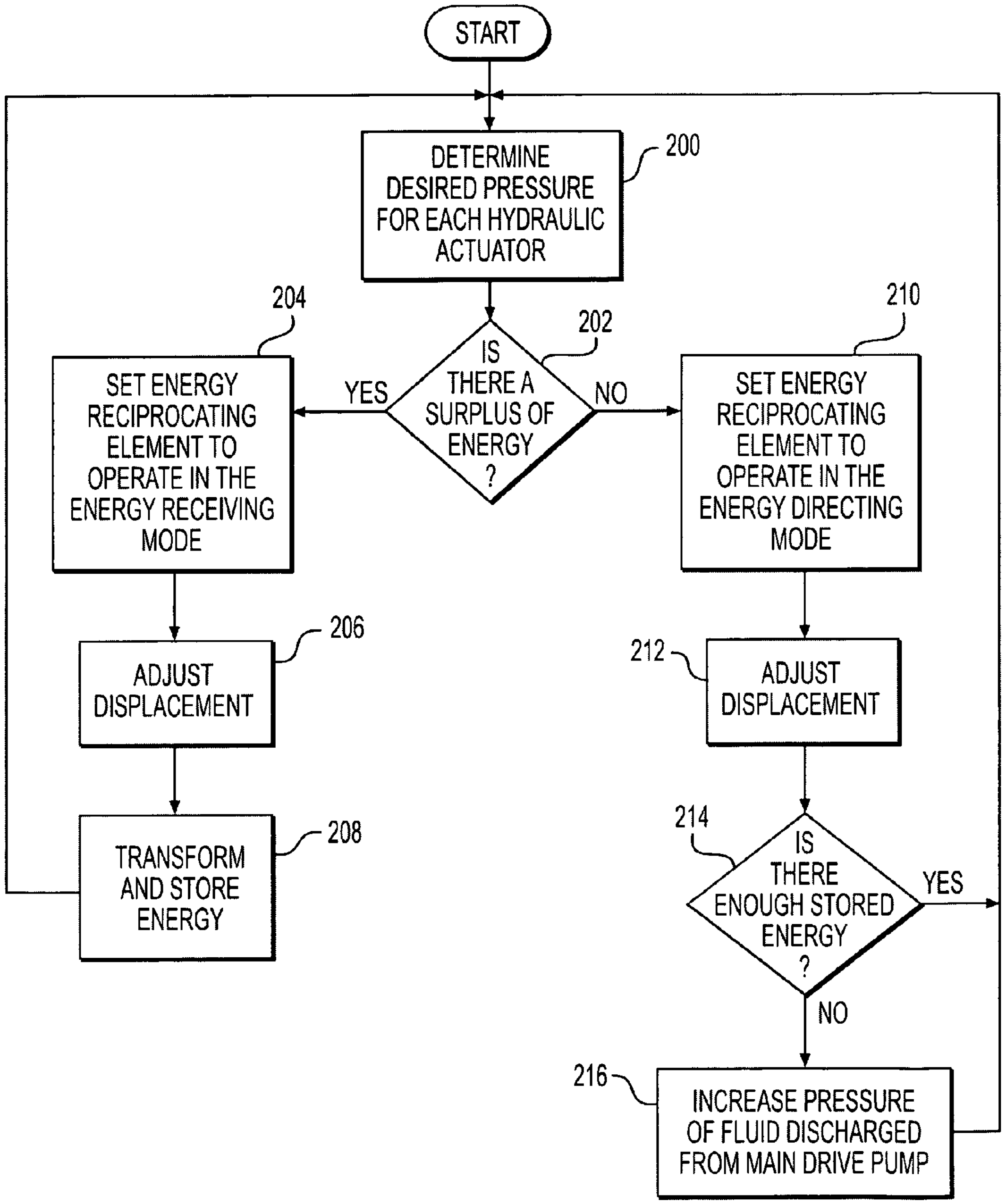
FIG. 6 is a flow chart illustrating an exemplary method for operating a rotary flow control valve associated with the exemplary hydraulic circuits of FIG. 3.
Figure 7:
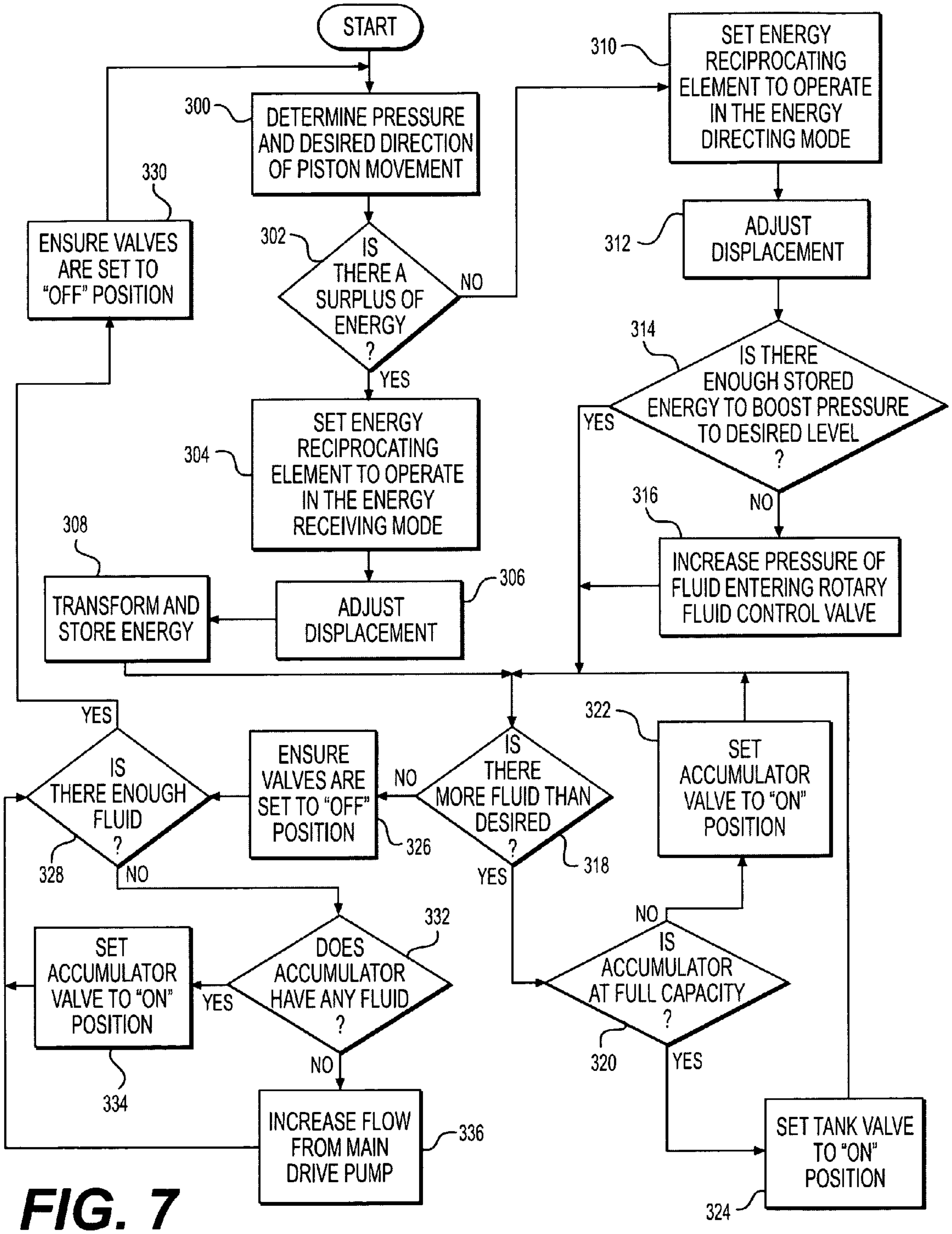
FIG. 7 is a flow chart illustrating an exemplary method for operating a rotary flow control valve of the exemplary hydraulic circuit of FIG. 4.

FIGS. 5, 6, and 7, which are discussed in the following section, illustrate the operation of rotary flow control valve 34. In particular, FIG. 5 illustrates an exemplary method for operating rotary flow control valve 34 when each hydraulic actuator 22 has a dedicated rotary flow control valve 34. FIG. 6 illustrates an exemplary method for operating rotary flow control valve 34 when a central rotary flow control valve 34 affects the pressure of multiple hydraulic actuators 22. FIG. 7 illustrates an exemplary method for operating rotary flow control valve 34 when actuator control valve 32 is omitted from hydraulic circuit 18.

INDUSTRIAL APPLICABILITY

The disclosed rotary flow control valve may improve efficiency and increase the versatility of the associated hydraulic circuit. In particular, the rotary flow control valve may be used in any hydraulic circuit serving one or more hydraulic actuators. By recovering unused energy, the rotary flow control valve may improve the efficiency and response of the hydraulic circuit. Operation of the rotary control valve will now be described.

FIG. 5 illustrates a flow diagram depicting an exemplary method for operating rotary flow control valve 34, which may affect the pressure of fluid being supplied to hydraulic actuator 22. Such a system is shown in FIG. 2. The method may begin when the desired pressure of fluid entering hydraulic actuator 22 is determined (step 100). Such a pressure may be determined in any number of ways such as, for example, receiving signals from operator input devices and/or various sensors (not shown) located in hydraulic actuator 22, hydraulic circuit 18, or any other location within machine 10. In addition, it is contemplated that the desired pressure may be a specific pressure or a range of pressures. After the desired pressure has been determined, it may be determined whether the current pressure of fluid being supplied to hydraulic actuator 22 is greater than the desired pressure (step 102). Once again, such a pressure may be determined in any number of ways such as, for example, receiving signals from various sensors (not shown) located in hydraulic actuator 22, hydraulic circuit 18, or any other location within machine 10.

If the current pressure of fluid being supplied to hydraulic actuator 22 is greater than the desired pressure (step 102: Yes), ED element 54 may be set to operate in the energy receiving mode (step 104). If ED element 54 is already operating in the energy receiving mode, ED element 54 may continue to operate in the energy receiving mode. When ED element 54 is operating in the energy receiving mode, energy that may be stored in energy storage device 58 may be prevented from being directed to ED element 54. This may be accomplished by setting a switch (not shown) associated with energy storage device 58 to a desired position (if ED element 54 is a motor/generator) or setting a valve (not shown) associated with energy storage device 58 to a position (if ED element 54 is a pump/motor), which may restrict the flow of energy out of energy storage device 58 but may permit the flow of energy into energy storage device 58.

After ED element 54 has been set to operate in the energy receiving mode, the displacement setting of PA element 52 may be adjusted to throttle, i.e., reduce, the pressure of fluid flowing through PA element 52 to the desired fluid pressure (step 106). For example, the volume change of fluid flowing through PA element 52 may be increased or decreased to vary pressure change of fluid flowing through PA element 52. As mechanical energy is generated by PA element 52, such mechanical energy may be transformed into a storable form by ED element 54 and stored in energy storage device 58 (step 108). The storable form may be, for example, electrical or pressure energy. After the energy has been stored, step 100 may be repeated (i.e., the desired pressure of fluid entering hydraulic actuator 22 may be determined).

Referring back to step 102, if the pressure of fluid being supplied to hydraulic actuator 22 is not greater than the desired pressure (step 102: No), it may be determined whether the pressure being supplied to hydraulic actuator 22 is less than the desired pressure (step 110). If the current pressure of fluid being supplied to hydraulic actuator 22 is not less than the desired pressure (step 110: No), step 100 may be repeated (i.e., the desired pressure of fluid entering hydraulic actuator 22 may be determined).

However, if it is determined that the current pressure of fluid being supplied to hydraulic actuator 22 is less than the desired pressure (step 110: Yes), ED element 54 may be set to operate in the energy directing mode (step 112). If ED element 54 is already operating in the energy directing mode, ED element 54 may continue to operate in the energy directing mode. While ED element 54 is operating in the energy directing mode, ED element 54 may receive stored energy from energy storage device 58. This may be accomplished by setting a switch (not shown) associated with energy storage device 58 (if ED element 54 is a motor/generator) or setting a valve (not shown) associated with energy storage device 58 (if ED element 54 is a pump/motor) to a position, which may permit the flow of energy out of energy storage device 58. As the ED element 54 receives stored energy from energy storage device 58, ED Element 54 may convert the stored energy to mechanical energy, which may cause shaft 56 to rotate and drive PA element 52.

After ED element 54 has been set to operate in the energy directing mode, the displacement setting of PA element 52 may be adjusted to boost, i.e., increase, the pressure of fluid flowing through PA element 52 to the desired fluid pressure (step 114). For example, the volume change of fluid flowing through PA element 52 may be increased or decreased to vary pressure change of fluid flowing through PA element 52. The amount of energy consumed by PA element 52 may be related to the pressure change of fluid as it flows through PA element 52. For example, larger pressure boosts may consume more energy than smaller pressure boosts.

To ensure that enough energy is available to achieve the desired pressure boost, it may be determined whether there is enough energy in energy storage device 58 to boost the fluid pressure to the desired level (step 116). Such a determination may be made in any number of ways. For example, the energy stored in energy storage device may be measured by various sensors (not shown), and the measured energy level may be compared to the energy level needed to achieve the pressure change. Alternatively, the determination may be made by monitoring the pressure change. If the fluid pressure stops increasing before the desired pressure is reached, there might not be enough energy stored in energy storage device 58. If it is determined that there is enough energy stored in energy storage device 58 to boost the fluid pressure to the desired level (step 116: Yes), step 100 may be repeated (i.e., the desired pressure of fluid entering hydraulic actuator 22 may be determined).

However, if it is determined that there is not enough energy stored in energy storage device 58 to boost the fluid pressure to the desired level (step 116: No), main drive pump 16 may be adjusted to increase the pressure level of fluid being supplied to hydraulic circuit 18 (step 118). This may reduce the pressure increase needed to achieve the desired pressure, thereby reducing the amount of energy needed to boost the pressure. After main drive pump 16 has been adjusted, step 100 may be repeated (i.e., the desired pressure of fluid entering hydraulic actuator 22 may be determined).

FIG. 6 illustrates a flow diagram depicting an exemplary method for operating rotary flow control valve 34, which may affect the pressure of fluid being supplied to multiple hydraulic actuators 22 via the system illustrated in FIG. 3. The method may begin when the desired pressure of fluid entering each hydraulic actuator 22 is determined (step 200). Such a pressure may be determined in a manner similar to that disclosed above for the method illustrated in FIG. 5. After the desired pressure of fluid being supplied to each hydraulic actuator 22 has been determined, it may be determined whether there is a surplus of energy generated by PA elements 52 (step 202). This determination may be made in any number of ways. For example, the energy flowing into energy storage device 58 may be measured. If the energy level does not increase over time, PA elements 52 may not be generating an energy surplus. In another exemplary embodiment, the pressure changes of each PA element 52 may be monitored. If any PA element 52 is not able to achieve its desired pressure change, PA elements 52 may not be generating a surplus of energy.

If PA elements 52 are generating a surplus of energy (step 202: Yes), ED element 54 may be set to operate in the energy receiving mode (step 204). If ED element 54 is already operating in the energy receiving mode, ED element 54 may continue to operate in the energy receiving mode. As disclosed above, when operating in the energy receiving mode, energy stored in energy storage device 58 may be prevented from being directed to ED element 54.

After ED element 54 has been set to operate in the energy receiving mode, the displacement settings of each PA element 52 may be adjusted to either reduce or boost the pressure of fluid flowing through each PA element 52 to the desired fluid pressure (step 206). For example, the volume change of fluid flowing through each PA element 52 may be increased or decreased to vary the pressure change of fluid flowing through each PA element 52. Because the pressure changes may vary from PA element 52 to PA element 52, the displacement settings may take into account the effect other PA elements 52 may have on each PA element 52.

As a surplus of mechanical energy is generated by PA elements 52, the mechanical energy may be transformed into a storable form by ED element 54 and stored in energy storage device 58 (step 208). The storable form may be, for example, electrical or pressure energy. After the energy has been stored, step 200 may be repeated (i.e., the desired pressure of fluid entering each hydraulic actuator 22 may be determined).

Referring back to step 202, if PA elements 52 are not generating a surplus of energy (step 202: No), ED element 54 may be set to operate in the energy directing mode (step 210). If ED element 54 is already operating in the energy directing mode, ED element 54 may continue to operate in the energy directing mode. While ED element 54 is operating in the energy directing mode, ED element 54 may receive stored energy from energy storage device 58. This may be accomplished in a manner similar to that disclosed above for the method illustrated in FIG. 5. As ED element 54 receives stored energy from energy storage device 58, ED element 54 may convert the stored energy to mechanical energy, which may assist the pressure reducing PA elements 52 to rotate shaft 56 and drive the pressure boosting PA elements 52.

After ED element 54 has been set to operate in the energy receiving mode, the displacement settings of each PA element 52 may be adjusted to either reduce or boost the pressure of fluid flowing through each PA element 52 to the desired fluid pressure (step 212). For example, the volume change of fluid flowing through each PA element 52 may be increased or decreased to vary the pressure change of fluid flowing through each PA element 52. Because the pressure changes may vary from PA element 52 to PA element 52, the displacement settings may take into account the effect other PA elements 52 may have on each PA element 52.

To ensure that enough energy is available to achieve the desired pressure boosts, it may be determined whether there is enough energy in energy storage device 58 to adequately drive the pressure boosting PA elements 52 (step 214). Such a determination may be made in any number of ways. For example, the energy stored in energy storage device may be measured by various sensors (not shown), and the measured energy level may be compared to the energy level needed to assist the pressure reducing PA elements 52 to drive the pressure boosting PA elements 52. In alternatively, the determination may be made by monitoring the pressure changes associated with the pressure boosting PA elements 52. If any pressure boosting PA elements 52 are unable to achieve a desired pressure level, there might not be enough energy stored in energy storage device 58. If it is determined that there is enough energy stored in energy storage device 58 (step 214: Yes), step 200 may be repeated (i.e., the desired pressure of fluid entering hydraulic actuator 22 may be determined).

If it is determined that there is not enough energy stored in energy storage device 58 (step 214: No), main drive pump 16 may be adjusted to increase the pressure level of fluid being discharged from main drive pump 16 (step 216). This may reduce the pressure boosts needed to achieve the desired pressures, thereby reducing the amount of energy needed by the pressure boosting PA elements 52. After main drive pump 16 has been adjusted, step 200 may be repeated (i.e., the desired pressure of fluid entering hydraulic actuator 22 may be determined).

FIG. 7 illustrates a flow diagram depicting an exemplary method for operating rotary flow control valve 34, which may affect the pressure and flow rate of fluid being supplied to hydraulic actuator 22. Such a system is shown in FIG. 4. The method may begin when the desired pressure of fluid entering each hydraulic actuator 22 and the desired direction of piston movement is determined (i.e., which hydraulic chamber of hydraulic actuator 22 is expanding and which hydraulic chamber is contracting) (step 300). Such a pressure may be determined in a manner similar to that disclosed above for the method illustrated in FIG. 5. In addition, the desired piston movement may be determined by any method such as, for example, receiving signals from various sensors (not shown) associated with hydraulic actuator 22 or an operator input.

After the desired pressure of fluid being supplied to hydraulic actuator 22 and the desired piston movement have been determined, it may be determined whether there is a surplus of energy generated by first and second OPA elements 62, 64 (step 302). This determination may be made in a manner similar to that disclosed above for the method of FIG. 6. If first and second OPA elements 62, 64 are generating a surplus of energy (step 302: Yes), ED element 54 may be set to operate in the energy receiving mode (step 304). If ED element 54 is already operating in the energy receiving mode, ED element 54 may continue to operate in the energy receiving mode. As disclosed above, when operating in the energy receiving mode, energy that may be stored in energy storage device 58 may be prevented from being directed to ED element 54.

After ED element 54 has been set to operate in the energy receiving mode, the displacement settings of first and second OPA elements 62, 64 may be adjusted to either reduce or boost the pressure of fluid flowing through each OPA element 62, 64 to the desired fluid pressure (step 306). For example, the volume change of fluid flowing through each OPA element 62, 64 may be increased or decreased to vary pressure change of fluid flowing through each OPA element 62, 64. Because the pressure changes may vary between first OPA element 62 and second OPA element 64, the displacement settings may take into account the effect first and second OPA elements 62, 64 may have on each other. In addition, the displacement setting of first OPA element 62 may be adjusted to either draw fluid from or direct fluid to chamber 28. Furthermore, the displacement setting of second OPA element 64 may be adjusted to either draw fluid from or direct fluid to chamber 30.

As a surplus of mechanical energy is generated by first and second OPA elements 62, 64, the mechanical energy may be transformed into a storable form by ED element 54 and stored in energy storage device 58 (step 308). The storable form may be, for example, electrical or pressure energy.

Referring back to step 302, if first and second OPA elements 62, 64 are not generating a surplus of energy (step 302: No), ED element 54 may be set to operate in the energy directing mode (step 310). If ED element 54 is already operating in the energy directing mode, ED element 54 may continue to operate in the energy directing mode. While ED element 54 is operating in the energy directing mode, ED element 54 may receive stored energy from energy storage device 58. This may be accomplished in a manner similar to that disclosed above for the method illustrated in FIG. 5. As ED element 54 receives stored energy from energy storage device 58, ED Element 54 may convert the stored energy to mechanical energy, which may be used to rotate shaft 56.

After ED element 54 has been set to operate in the energy directing mode, the displacement settings of first and second OPA elements 62, 64 may be adjusted to either reduce or boost the pressure of fluid flowing through each of first and second OPA elements 62, 64 to the desired fluid pressure (step 312). For example, the volume change of fluid flowing through each of first and second OPA elements 62, 64 may be increased or decreased to vary the pressure change of fluid flowing through each of first and second OPA elements 62, 64. Because the pressure changes of first and second OPA 62, 64 may be different from each other, the displacement settings may take into account the effect first and second OPA elements 62, 64 may have on each other.

To ensure that enough energy is available to achieve the desired pressure boosts, it may be determined whether there is enough energy in energy storage device 58 to adequately rotate shaft 56 (step 314). Such a determination may be made in a manner similar to that disclosed above for the method illustrated in FIG. 6. If it is determined that there is not enough energy stored in energy storage device 58 (step 314: No), main drive pump 16 may be adjusted to increase the pressure level of fluid being supplied to hydraulic circuit 18 (step 316). This may reduce the pressure boost needed to achieve the desired pressure, thereby reducing the energy needed to boost the pressure.

If steps 308 or 314 have been performed, or if it is determined that there is enough energy stored in energy storage device 58 (step 314: Yes), it may be determined whether there is more fluid in hydraulic circuit 18 than desired (step 318). Hydraulic circuit 18 may have more fluid than desired if, for example, the flow rate of the fluid is higher than desired or rotary flow control valve 34 is unable to throttle the pressure of the fluid to the desired level. If it is determined that hydraulic circuit 18 has more fluid than desired (step 318: Yes), it may be determined whether accumulator 74 is at full capacity (step 320). If accumulator 74 is not at full capacity (step 320: No), on/off valve 76 may be set to an "on" position to permit the flow of fluid into accumulator 74 (step 322). However, if accumulator 74 is at full capacity (step 320: Yes), on/off valve 78 may be set to an "on" position so that fluid may be directed to tank 14 (step 324).

After either on/off valve 76 or on/off valve 78 has been set to an "on" position, step 318 may be repeated (i.e., it may be determined whether there is more fluid in hydraulic circuit 18 than desired). If it is determined that there is not more fluid in hydraulic circuit 18 than desired (step 320: No), it may be ensured that the positions of on/off valves 76 and 78 are set to their "off" positions (step 326). If any of on/off valve 76 and 78 are currently set to the "on" position, they may be set to the "off" position.

After it has been ensured that on/off valves 76 and 78 are set to their "off" positions, it may be determined whether there is enough fluid in hydraulic circuit 18 (step 328). There may not be enough fluid in hydraulic circuit 18, for example, if the flow rate of the fluid is too low or if rotary flow control valve 34 cannot boost the pressure of the fluid to the desired level. If it is determined that there is enough fluid in hydraulic circuit 18 (step 328: Yes), it may again be ensured that the positions of on/off valves 76 and 78 are set to their "off" positions (step 328). If any of on/off valve 76 and 78 are currently set to the "on" position, they may be set to the "off" position. After it has been ensured that on/off valves 76 and 78 are set to their "off" positions, step 300 may be repeated (i.e., the desired pressure of fluid entering each hydraulic actuator 22 and the desired direction of piston movement is determined).

If it is determined that there is not enough fluid in hydraulic circuit 18 (step 328: No), it may be determined whether accumulator 74 contains any fluid (step 332). If accumulator 74 contains any fluid (step 332: Yes), on/off valve 76 may be set to the "on" position (step 334). This may permit fluid to flow from accumulator 74 to hydraulic circuit 18. After on/off valve 76 has been set to the "on" position, step 328 may be repeated (i.e., it may be determined whether there is enough fluid in hydraulic circuit 18). If accumulator 74 does not contain fluid (step 332: No), main drive pump 16 may be adjusted to increase the flow of fluid to hydraulic circuit 18 (step 336). After main drive pump 16 is adjusted, step 328 may be repeated (i.e., it may be determined whether there is enough fluid in hydraulic circuit 18).

Associating the rotary flow control devices with fluid being directed to the hydraulic actuators may increase the energy recovered from throttling the fluid that would otherwise be wasted, thereby improving efficiency. In addition, directly connecting the rotary flow control device to the chambers of the hydraulic cylinder may further increase efficiency because the rotary flow control valve may recover energy from the return fluid in addition to the supply fluid. Furthermore, the rotary flow control device may affect the flow rate in addition to the pressure of fluid being supplied to and returning from the hydraulic actuator, thereby reducing the number of components of the hydraulic circuit, which may reduce the complexity of the system and reduce costs.

In addition, dedicating a pressure adjusting element to each hydraulic actuator may improve the efficiency and performance of the machine during pressure boosting events. In particular, such a configuration may ensure that only the pressure of fluid being supplied to a particular hydraulic actuator may be increased rather than fluid being supplied to all hydraulic actuators. This may reduce the energy needed to perform the pressure boost and may limit the energy that is wasted due to throttling.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A hydraulic circuit, comprising:

a hydraulic actuator; and a flow control valve, including:

a pressure adjusting element fluidly coupled to the hydraulic actuator and situated to affect a pressure of fluid being directed to the hydraulic actuator; and an energy directing element operatively coupled to the pressure adjusting element and situated to be driven by the pressure adjusting element when the pressure adjusting element is selectively throttling fluid being directed to the hydraulic actuator.

2. The hydraulic circuit of claim 1, wherein the energy directing element is further situated to drive the pressure adjusting element when the pressure adjusting element is boosting the pressure of fluid being directed to the associated hydraulic actuator.

3. The hydraulic circuit of claim 2, wherein:

the energy directing element is situated to be driven by the pressure adjusting element when a pressure of fluid being directed to the hydraulic actuator is greater than a first pressure value; and the energy directing element is situated to drive the pressure adjusting element when a pressure of fluid being directed to the hydraulic actuator is less than the first pressure value.

4. The hydraulic circuit of claim 1, wherein the pressure adjusting element is a variable displacement pump.

5. The hydraulic circuit of claim 1, wherein the energy directing element is either an electric motor/generator or a fluid pump/motor.

6. The hydraulic circuit of claim 1, wherein the flow control valve further includes an energy storage device operatively coupled to the energy directing element and situated to store the energy received by the energy directing element when the energy directing element is being driven by the pressure adjusting element.

7. A hydraulic system, comprising:

one or more hydraulic actuators; and one or more flow control valves fluidly coupled to the one or more hydraulic actuators, each of the one or more flow control valves including:

a plurality of pressure adjusting elements fluidly connected to an associated hydraulic actuator and situated to affect a pressure of a fluid being directed to the associated hydraulic actuator; and an energy directing element operatively coupled to the plurality of pressure adjusting elements and situated to be driven by the plurality of pressure adjusting elements when the plurality of pressure adjusting elements generate a surplus of energy.

8. The hydraulic system of claim 7, wherein the energy directing element is further situated to drive at least one of the plurality of pressure adjusting elements when the plurality of pressure adjusting elements are not generating a surplus of energy.

9. The hydraulic system of claim 7, wherein each of the plurality of pressure adjusting elements are situated to selectively drive and be selectively driven by other pressure adjusting elements.

10. The hydraulic system of claim 7, wherein each of the plurality of pressure adjusting elements are situated to be selectively driven simultaneously by other pressure adjusting elements and the energy directing element.

11. The hydraulic system of claim 7, further including an energy directing element operatively coupled to the plurality of pressure adjusting elements and situated to be driven by the plurality of pressure adjusting elements when the plurality of pressure adjusting elements generate a surplus of energy.

12. The hydraulic system of claim 7, wherein a first pressure adjusting element of the plurality of pressure adjusting elements is fluidly connected to a first chamber of an associated hydraulic actuator.

13. The hydraulic system of claim 12, wherein a second pressure adjusting element of the plurality of pressure adjusting elements is fluidly connected to a second chamber of the associated hydraulic actuator.

14. The hydraulic system of claim 13, wherein the first pressure adjusting element of the plurality of pressure adjusting elements is situated to supply fluid to and draw fluid from the first chamber and the second pressure adjusting element of the plurality of pressure adjusting elements is situated to supply fluid to and draw fluid from the second chamber.

15. A method for regulating the flow of fluid to and from a hydraulic actuator, comprising:

directing a fluid to the hydraulic actuator;

determining a first pressure value;

determining if a second pressure value, indicative of a pressure of the fluid, is greater than the first pressure value;

selectively throttling the fluid being directed to the hydraulic actuator by extracting energy from the fluid if the second pressure value is greater than the first pressure value; and selectively boosting the fluid being directed to the hydraulic actuator by providing energy to the fluid if the second pressure value is less than the first pressure value.

16. The method of claim 15, further including transforming the extracted energy into a storable form and storing the extracted energy.

17. The method of claim 15, further including throttling a pressure of fluid directed to a first or a second chamber of the hydraulic actuator by extracting energy from the fluid flow and storing the extracted energy.

18. The method of claim 17, further including boosting a pressure of fluid being directed to a first or a second chamber of the hydraulic actuator by providing the stored energy to the fluid flow.

19. The method of claim 15, further including throttling a pressure of fluid received from the first or second chamber of the hydraulic actuator by extracting energy from the fluid and storing the extracted energy.

20. The method of claim 19, further including boosting a pressure of fluid received from a first or a second chamber of the hydraulic actuator by providing the stored energy to the fluid flow.

* * * * *